(12) United States Patent  
Bezryadin

(10) Patent No.: US 8,270,710 B2  
(45) Date of Patent: Sep. 18, 2012

(54) REPRESENTATION AND QUANTIZATION OF DIGITAL IMAGES AND EVALUATION OF COLOR DIFFERENCES

(75) Inventor: Sergey N. Bezryadin, San Francisco, CA (US)

(73) Assignee: Unified Color Technologies, LLC, South San Francisco, CA (US)

( * ) Notice: Subject to any disclaimer, the term of this patent is extended or adjusted under 35 U.S.C. 154(b) by 995 days.

(21) Appl. No.: 12/260,005

(22) Filed: Oct. 28, 2008

(65) Prior Publication Data

US 2009/0097760 A1 Apr. 16, 2009

Related U.S. Application Data

(63) Continuation-in-part of application No. 11/870,904, filed on Oct. 11, 2007, now Pat. No. 8,019,150.

(51) Int. Cl.  
*G06K 9/00* (2006.01)  
*G09G 5/02* (2006.01)

(52) U.S. Cl. ......................... 382/162; 345/591

(58) Field of Classification Search .................. None  
See application file for complete search history.

(56) References Cited

U.S. PATENT DOCUMENTS

| | | | |
|---|---|---|---|
| 5,615,287 A * | 3/1997 | Fu et al. ........................ 382/232 |
| 6,178,269 B1 | 1/2001 | Acharya |
| 6,934,411 B2 | 8/2005 | Bezryadin |
| 6,941,331 B2 | 9/2005 | Bezryadin et al. |
| 7,031,404 B2 | 4/2006 | Lindquist |

| | | |
|---|---|---|
| 2004/0143380 A1 | 7/2004 | Stam et al. |
| 2007/0154083 A1 | 7/2007 | Bezryadin |
| 2008/0123942 A1 | 5/2008 | Bezryadin |

OTHER PUBLICATIONS

U.S. Appl. No. 11/377,591, filed Mar. 16, 2006, entitled "Editing (Including Saturation Editing) of Digital Color Images,".  
U.S. Appl. No. 11/494,393, filed Jul. 26, 2006, entitled "Editing of Digital Images, Including (But Not Limited to) Highlighting and Shadowing of Image Areas,".  
U.S. Appl. No. 11/432,221, filed May 10, 2006, entitled "Editing of Digital Images, Including (But Not Limited to) Color-To-Monochromatic Conversion and Changing the Color of Monochromatic Image,".  
U.S. Appl. No. 11/322,111, filed Dec. 28, 2005, entitled "Color Coordinate Systems Including Systems with a Coordinate Defined by a Square Root of a Quadratic Polynomial in Tristimulus Values and, Possibly, by a Sign of a Function of One or More of Tristimulus Values,".  
U.S. Appl. No. 11/321,443, filed Dec. 28, 2005, entitled "Color Editing (Including Brightness Editing) Using Color Coordinate Systems Including Systems With a Coordinate Defined by a Square Root of a Quadratic Polynomial in Tristimulus Values and, Possibly, by a Sign of a Function of One or More of Tristimulus Values,".

(Continued)

*Primary Examiner* — Li Liu  
(74) *Attorney, Agent, or Firm* — Michael Shenker; Haynes and Boone, LLP

(57) ABSTRACT

Digital image data are coded in a color coordinate system bef where $b = 0.3 \cdot \ln B$ and B, e, and f are Bef coordinates. This coding has high perceptual uniformity with respect to coding errors. A color difference formula is provided, with the color difference defined as $100\sqrt{\Delta b^2 + \Delta e^2 + \Delta f^2}$. The high perceptual uniformity of this color difference formula is shown using a non-uniformity coefficient developed by the inventor(s). Other features are also provided.

75 Claims, 3 Drawing Sheets

OTHER PUBLICATIONS

U.S. Appl. No. 11/377,161, filed Mar. 16, 2006, entitled "Editing (Including Contrast and Sharpness Editing) of Digital Images,".

U.S. Appl. No. 11/376,837, filed Mar. 16, 2006, entitled "Editing (Including Hue Editing) of Digital Color Images,".

MacAdam, "Orthogonal Color Matching Functions," Journal of Optical Society of America, 1954, vol. 44, pp. 713-724.

Cohen, Jozef "Two Preferred Reference Frames in Fundamental Color Space" Visual Color and Color Mixture: The Fundamental Color Space, Huguette Cohen, 2001, pp. 94-95, 100-103.

Pratt, William K., "Digital Image Processing—PIKS Inside ($3^{rd}$ Edition)" John Wiley & Sons, Inc. 2001, pp. 189-210.

Larson, Gregory Ward "The LogLuv Encoding for Full Gamut, High Dynamic Range Images," Silicon Graphics, Inc., no later than Nov. 2, 2006.

Xu, Ruifeng; Pattanaik, Sumanta N.; Hughes, Charles E. "High-Dynamic-Range Still-Image Encoding in JPEG 2000" IEEE Computer Society, IEEE Computer Graphics and Applications 2005, p. 69-76.

Mantiuk, Rafal; Myszkowski, Karol; Seidel, Hans-Peter "Lossy Compression of High Dynamic Range Images and Video" MPI INformatik, Stuhlsatzenhausweb 85, 66123 Saarbrucken, Germany, Jan. 2006.

Otim, Stephen O.; Jospeh, Dileepan; Choubey, Bhaskar; Collins, Steven "Modelling of High Dynamic Range Logarithmic CMOS Image Sensors" IMTC 2004—Instrumentation and Measurement Technology Conference, Como, Italy, May 18-20, 2004.

G. Yourganov, W. Stuerzlinger "Tone-Mapping for High Dynamic Range Images" Technical Report, Department of Computer Science, York University, Dec. 2001.

Ward, Greg "High Dynamic Range Image Encodings," May 21, 2001.

Spaulding, Kevin E.; Woolfe, Geoffrey J.; Giorgianni, Edward J. "Reference Input/Output Medium Metric RGB Color Encodings (RIMM/ROMM RGB)" PICS 2000 Conference, Mar. 26-29, 2000, Portland Oregon.

Morse, Bryan "Some Important Properties of Human Vision—CS450: Introduction to Digital Signal and Image Processing" BYU Computer Science, no later than Oct. 17, 2006.

Choo, Shuo-yen and Chew, Gregory "JPEG 2000 and Wavelet Compression" EE362 Stanford University, pp. 1-18, no later than Feb. 26, 2007.

U.S. Appl. No. 11/564,730, filed Nov. 29, 2006, entitled "Image Processing Including, But Not Limited to, Logarithimic Coding in Color Coordinate Systems Including Systems With a Coordinate Defined by a Square Root of a Quadratic Polynomial in Tristimulus Values and, Possibly, by a Sign of a Function of One or More of Tristimulus Values,".

Wyszecki & Stiles, "Color Science; Concepts and Methods, Quantitative Data and Formulae" ($2^{nd}$ Ed. 2000), Section 5.4 (pp. 306-330; 793-803).

Bezryadin, Sergey; Bourov, Pavel, "Local Criterion of Quality for Color Difference Formula," International Conference on Printing Technology, St. Petersburg, Russia, Jun. 26-30, 2006, 5 pages.

Bezryadin, Sergey; Bourov, Pavel, "Color Coordinate Systems for Accurate Color Image Editing Software," International Conference on Printing Technology, St. Petersburg, Russia, Jun. 26-30, 2006, 4 pages.

S. Bezryadin, "LinLogBef File Format for HDR Image," IS&T/SID $15^{th}$ Color Imaging Conference, p. 294-243, 2007.

S. Bezryadin, P. Burov, I. Tryndin, "Chromatic Coordinates in HDR Image Coding," IS&T/SPIE 20th Electronic Imaging, Proceedings of SPIE vol. 6817: Digital Photography IV, 68170W, 2008.

G. Ward Larson, "Overcoming Gamut and Dynamic Range Limitations in Digital Images," IS&T/SID $6^{th}$ Color Imaging Conference, 1998.

P. Bourov and S. Bezryadin, "Analysis of Experimental Data Used for Development of CIE DE 2000 Color Difference Formula," IS&T Printing Technology SPb'06, 2006.

"Color Difference" Wikipedia, the free encyclopedia, 7 pages, Oct. 28, 2008.

Sergey Bezryadin, and Pavel Burov, "*HDR Image Archiving Optimization*," pp. 193-197, Bern, Switzerland, Jun. 2008, vol. 5, ISBN / ISSN: 978-0-892080277-3.

Wyszecki & Stiles, "Color Science" ($2^{nd}$ Ed. 2000), pp. 825-830.

* cited by examiner

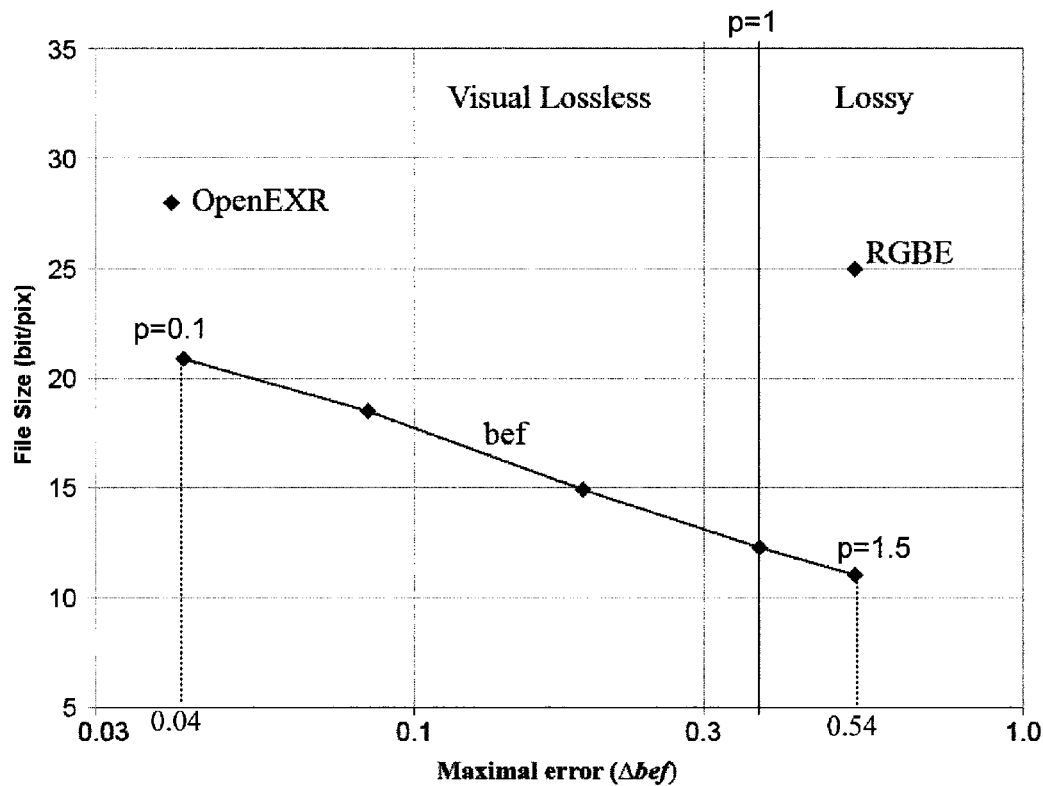
FIG. 5
FIG. 6
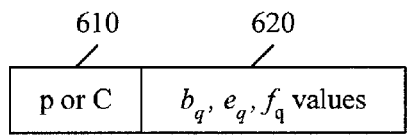
FIG. 7
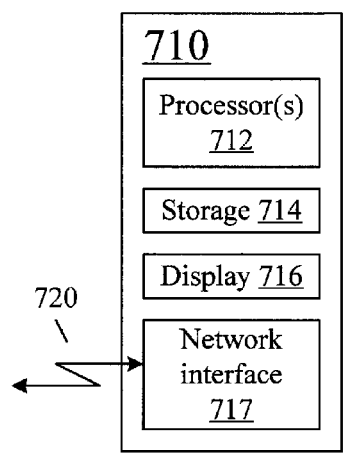

ated Sep. 13, 2011.

REPRESENTATION AND QUANTIZATION OF DIGITAL IMAGES AND EVALUATION OF COLOR DIFFERENCES

CROSS REFERENCE TO RELATED APPLICATIONS

The present invention is a continuation-in-part of U.S. patent application Ser. No. 11/870,904, filed on Oct. 11, 2007, incorporated herein by reference, now U.S. Pat. No. 8,019, 150, issued Sep. 13, 2011.

BACKGROUND OF THE INVENTION

The present invention relates to digital image evaluation and processing such as, for example, storage, transmission, and editing of digital images and evaluation of color differences.

Storage and transmission of digital images play an important role in the modern information society due to heavy use of digital images for information storage. Archives, museums, libraries, professional photographers and magazines archive their exhibits in digital form. Digital representation of an image may require large amounts of data, and hence archiving and transmission may be expensive in terms of time, computing power, bandwidth, etc. Therefore, while a desirable file format for storage of digital images should support most or all visible colors to allow visually lossless image representation, the file size should be as small as possible. Further, the file format should preferably be convenient for image editing, or allow computationally inexpensive conversion to and from a format convenient for image editing.

Image preparation for storage or transmission typically involves quantization, then decorrelation (e.g. via wavelet transform), and then compression of decorrelation coefficients (e.g. via variable length coding). Quantization involves reducing the set of color stimuli available to represent the image. FIG. 1 illustrates a typical quantization process. The set of all color stimuli is subdivided into cells $110.1$, $110.2$, . . . . A representative color stimulus $120.i$ ($i=1$, $2$, . . . ) is defined for each cell $110.i$. Typically, the color stimulus $120.i$ is chosen somewhere in the middle of cell $110.i$. In the quantization process, any color stimulus present in a digital image and belonging to a cell $110.i$ is replaced with the corresponding representative color stimulus $120.i$.

Any errors introduced into the image in the quantization process should preferably be small so that image distortion would be imperceptible to a human observer (the "visual lossiness" condition). In particular, the color stimuli in each cell $110.i$ should be visually indistinguishable from the representative $120.i$. Moreover, the representative stimuli of adjacent cells (such as cells $110.1$, $110.2$) should be visually indistinguishable. On the other hand, to reduce the file size, the number of cells $110.i$ should be as small as possible. This typically means that the cells should be as large as possible. Making the cells as large as possible allows one to discard the largest possible amount of visually unnecessary information, and this principle is sometimes called "just noticeable difference" or JND.

In a computer, the color stimuli can be represented by their coordinates in some color coordinate system (CCS) such as $S_1S_2S_3$ in FIG. 1, and each coordinate $S_1$, $S_2$, $S_3$ can be quantized separately. In this process, the range of values of each coordinate is subdivided into intervals, and the color stimuli's coordinates lying in such intervals are replaced with the representative values for the intervals. This quantization method can be defined in the conceptual framework of FIG. 1 if each cell $110.i$ is a parallelepiped formed as a set product of three intervals, and each representative stimulus $120.i$ has coordinates that are representative values of the respective intervals.

One such quantization method is described in the article listed as [1] in the References section below immediately before the claims. That method quantizes color stimuli defined in either the CIE XYZ color coordinate system ("CCS") or its derivative system xyY. The color stimuli are quantized into 32-bit values, and we will refer to this method as LogLuv32. The luminance component Y is quantized into an integer value $L_e$ defined as follows:

$$L_e = \lfloor 256(\log_2 Y + 64) \rfloor \qquad (1)$$

The function $\lfloor \cdot \rfloor$ is the floor, i.e. if r is a real number, then $\lfloor r \rfloor$ is the largest integer not exceeding r. The value $L_e$ is coded as a 16-bit integer, with one bit for the sign and 15 bits for the magnitude. According to [1], the maximum error in quantization (1) is 0.27% (i.e. 0.0027) over the entire visible gamut.

For each color stimulus xyY, the LogLuv32 method quantizes the chrominance coordinates x, y into a pair of 8-bit integer values $u_e$, $v_e$ as follows:

$$u_e = \lfloor 410 u' \rfloor \qquad (2)$$

$$v_e = \lfloor 410 v' \rfloor$$

where $$u' = 4x/(-2x + 12y + 3)$$

$$v' = 9y/(-2x + 12y + 3) \qquad (3)$$

Another, similar format is described in [2], but with the Y coordinate being replaced by the real luminance L, i.e.

$$L_e = \lfloor 256(\log_2 L + 64) \rfloor \qquad (4)$$

According to [2], the image representation (2)-(4) is perceptually uniform. In addition to this 32-bit encoding method, the reference [2] provides a 24-bit encoding method (representing each color stimulus in 24 bits).

SUMMARY

This section summarizes some features of the invention. Other features may be described in the subsequent sections. The invention is defined by the appended claims, which are incorporated into this section by reference.

The inventor(s) have observed that a human user may desire to accept high image distortion in exchange for a smaller image size. Of note, a higher distortion (i.e. lower image precision) may be acceptable if the image was acquired by a noisy device (e.g. a noisy camera) because it is wasteful to store low order bits which represent noise and have no image information.

Therefore, it is desirable to allow the user to specify the quantization precision by some precision parameter. Further, the precision parameter should be meaningful to an unsophisticated user (as opposed, for example, to a parameter such as the number of bits per color stimulus). Some embodiments of the present invention provide a precision parameter which specifies the maximum acceptable quantization error in units of human visual perception. An example of such a unit is a color-difference unit called MacAdam (denoted as McA). More particularly, each color stimulus S can be associated with an indistinguishability region defined as the set of all color stimuli visually indistinguishable from S. The MacAdam unit is defined so that the distance between S and any color stimulus on the boundary of the indistinguishability region of S is exactly 1 McA. Thus, the unit of 1 McA correlates well with the concept of just noticeable difference (JND) and can be used as a quantitative indicator of JND. The invention is not limited to McA units however.

In some embodiments, a user can use the precision parameter to specify image precision exceeding JND. This may be desirable if additional errors are expected in subsequent image processing, e.g. in contrast or saturation editing or image compression. This may also be desirable if the image was obtained with a noisy camera and the JND precision would wastefully preserve the noise.

Some embodiments of the present invention provide a color difference formula useful for evaluation of differences between colors. This may be desirable for color evaluation in art and in industries related to paints and dies manufacturing, textile manufacturing, and others.

Some embodiments of the present invention use color coordinate systems provided by the inventor(s) which is convenient for use with the precision parameter described above and which allows computationally inexpensive conversion to color coordinate systems convenient for image editing or display.

Some embodiments of the present invention provide a color difference formula useful for evaluation of differences between colors. This may be desirable for color evaluation in art and in industries related to paints and dies manufacturing, textile manufacturing, and others.

The invention is not limited to the features and advantages described above except as defined by the appended claims.

BRIEF DESCRIPTION OF THE DRAWINGS

FIG. 5 illustrates experimental data obtained in quantization of digital images using some embodiments of the present invention and some prior art techniques.

FIG. 6 illustrates an exemplary file format for digital images quantized according to some embodiments of the present invention.

FIG. 7 is a block diagram of a computer system suitable for some embodiments of the present invention.

DESCRIPTION OF SOME EMBODIMENTS

The embodiments described in this section illustrate but do not limit the invention. The invention is defined by the appended claims.

Analytical evaluation of image distortion can be aided by a color difference formula providing a numeric difference between any two color stimuli. The numeric difference should correspond to the human visual perception of the color difference. If colors appear very different to a human, the numeric difference should be large. If colors appear similar, the numeric difference should be small. One such color difference formula is the Brown-MacAdam formula (or just "MacAdam formula" below) based on experimental studies of indistinguishability regions as described in [3]. For each color stimulus S, the corresponding indistinguishability region is defined as the set of all color stimuli visually indistinguishable from S. According to studies done by Brown, MacAdam, Wyszecki and Fielder as described in [3], each indistinguishability region can be represented in the CIE XYZ CCS as an ellipsoid with a center at S. The Brown-MacAdam formula assigns the value $\Delta s=1$ MacAdam (1 McA) to the color difference between S and any color stimulus on the boundary of the corresponding indistinguishability region. More generally, in the CIE xyY CCS, the Brown-MacAdam color difference $\Delta s$ between any two adjacent color stimuli $S=(x,y,Y)$ and $S'=(x',y',Y')$ is defined as a square root of a quadratic polynomial in $\Delta x=x'-x$, $\Delta y=y'-y$, and $\Delta Y=Y'-Y$.

The Brown-MacAdam formula is inconvenient because the quadratic polynomial's coefficients depend on S. In addition, the coefficients have been obtained (experimentally) only for a small portion of the visible gamut.

A more convenient color difference formula, also described in [3], is the CIE76 formula $$\Delta E_{ab} = \sqrt{\Delta L^{*2} + \Delta a^{*2} + \Delta b^{*2}} \tag{5}$$

where L*, a*, b* are CIELAB coordinates. Another color difference formula using the CIELAB coordinates is CIEDE2000. This latter formula is rather complex. Also, this formula does not seem to be in good agreement with human visual perception. See [4].

A good color difference formula should be computationally simple in a CCS convenient for color editing, and should agree well with human visual perception. Further, it is desirable to be able to evaluate and compare different color difference formulae for agreement with human visual perception. In particular, there should be an evaluation method evaluating a given color difference formula for agreement with existing and/or future experimental data on human visual perception.

The inventor(s) have met this need by defining a coefficient of non-uniformity. This coefficient is a numeric parameter indicating the degree of conformity of any color difference formula with the indistinguishability regions defined in [3], and such a coefficient can be computed for new indistinguishability regions which can be experimentally obtained in the future.

Figure 1:
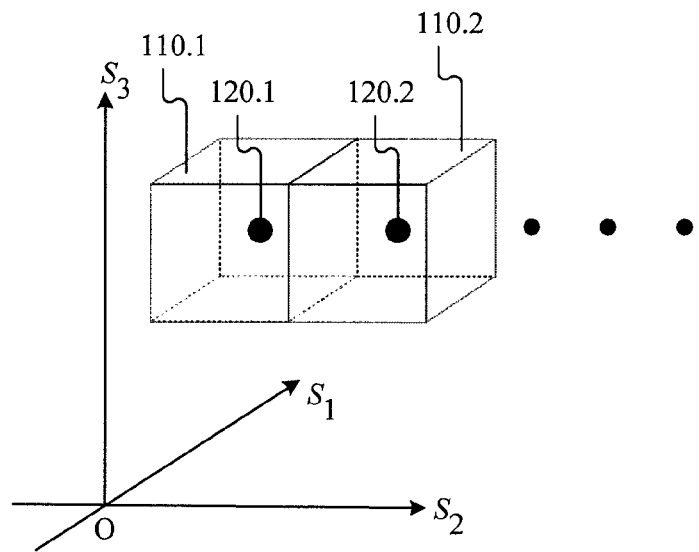
FIG. 1 illustrates decomposition of a set of colors into cells for quantization of digital images.
Figure 2:
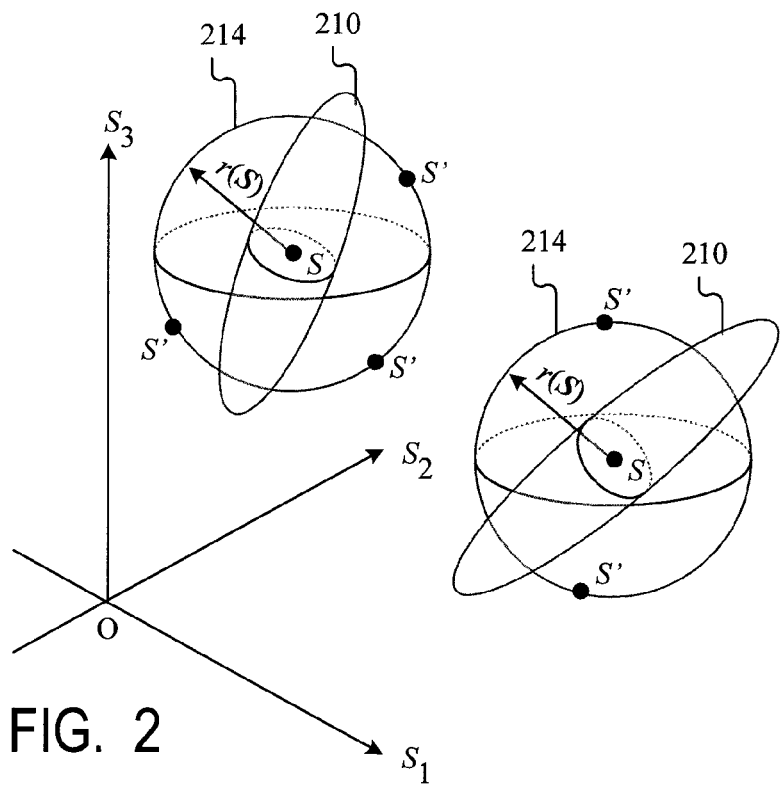
FIG. 2 illustrates the inventor(s)' method for evaluation and comparison of various color difference formulae.

For any color difference formula $\Delta E$, the non-uniformity coefficient is computed as illustrated in FIG. 2. The computation is based on color stimuli S with known indistinguishability regions 210. As described above, for each such color stimulus S, the corresponding indistinguishability region 210 is the set of all color stimuli within 1 McA from S. For each color stimulus S, consider a small sphere 214 centered at S of some radius r(S) under the $\Delta E$ metric. In other words, the sphere 214 is the following set:

$$\{S': \Delta E(S',S)=r(S)\} \tag{6}$$

The radius r(S) is chosen so that the sphere 214 includes points both inside and outside of the surface of the indistinguishability region 210 for S. If this is impossible, this probably means that for some choice of r(S) the sphere 214 coincides with the boundary of the region 210. In this case, r(S) should be such that the sphere 214 coincides or is close to the boundary of region 210.

Random points S' are chosen on each sphere 214 (the inventor(s) chose about $10^6$ points S' on each sphere). For each such point S', the Brown-MacAdam color difference $\Delta s$ between the point S' and the sphere's center S is computed. Let $\Delta$max and $\Delta$min denote respectfully the maximum and the minimum of all such color differences for all the random points S' on all the spheres 214. Then the non-uniformity coefficient is defined as the ratio $$\Delta\text{max}/\Delta\text{min} \tag{7}$$

The inventor(s) computed the non-uniformity coefficient for CIE76, CIEDE2000, and the inventor(s)' new color difference formula Δbef described below. For each of these formulae, the computation was performed for all of the ellipsoids described in [3] in Table I(5.4.3), at pages 801-803. The results are shown in Table 1 below. As is clear from the description above, the radii r(S) are not uniquely defined, but the inventor(s)' studies indicate that for different choices of r(S) the non-uniformity coefficient varies by less than 10%.

TABLE 1

Non-uniformity coefficient

| Color Difference Formula | Δmin (McA) | Δmax (McA) | Non-uniformity coefficient Δmax/Δmin |
|---|---|---|---|
| CIE76 | 0.231 | 1.75 | 7.59 |
| CIEDE2000 | 0.79 | 3.40 | 4.29 |
| Δbef | 0.49 | 1.69 | 3.43 |

Figure 3:
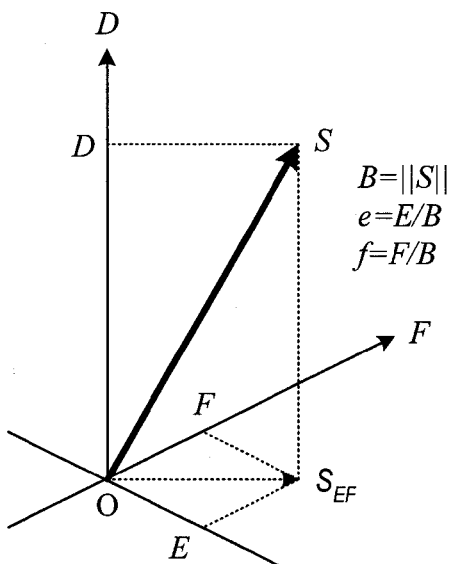
FIG. 3 illustrates a color coordinate system related to some embodiments of the present invention.

The color difference Δbef is defined based on the Bef CCS illustrated in FIG. 3 and described in [5]-[12]. This CCS is based on a linear CCS DEF2 (sometimes called also DEF) which is a linear transformation of CIE 1931 XYZ. The DEF2 CCS is orthonormal in the sense that its color matching functions are mutually orthogonal and of equal length in the function space $L^2$ if their wavelength argument λ is considered to change continuously, or in the real vector space $R^n$ if the wavelength λ varies over some number n of discrete values (in the latter case, the $R^n$ metric is sometimes called the Cohen metric). The positive half of the D axis in DEF2 corresponds to the standard Day light $D_{65}$; the positive half of the E axis corresponds to monochromatic red with λ=700 nm; and the positive half of the F axis corresponds to a yellow stimulus.

Bef is defined as follows:

$$B=\sqrt{D^2+E^2+F^2}$$

$$e=E/B$$

$$f=F/B \quad (8)$$

If B=0, then e and f are defined as 0.
The conversion from Bef to DEF2 is as follows:

$$E=e \cdot B$$

$$F=f \cdot B$$

$$D=\sqrt{B^2-E^2-F^2} \quad (8A)$$

D is uniquely defined because for all the colors in the visible gamut D≧0.

Clearly, B (brightness) is the Euclidean length of the color vector S. The value B agrees well with the human perception of brightness. This is believed to be at least partially due to the orthonormality of the underlying system DEF2, but the invention is not limited by the validity of this point of view. The e and f coordinates are chromatic in the sense that they are brightness independent. The separate representation of brightness and the chromatic information is good for obtaining high compression ratio should the brightness coordinate be compressed separately from the e and f coordinates. The separate representation of brightness and chromatic coordinates also makes it easier to devise a perceptually uniform quantization if each coordinate is quantized separately.

As described in [5]-[12], Bef is highly suited for image editing because the brightness editing may be performed by changing only the B coordinate and such change does not lead to visual changes in hue or saturation, and because editing of hue and saturation can be performed by changing the e and f coordinates without affecting the brightness. These benefits are believed to be at least partially due to the successful separation of brightness from the chromatic information in the Bef representation, and hence to the orthonormality of the underlying system DEF2, but the invention is not limited by the validity of this point of view.

It is known that at least when the luminance is sufficiently large, the human perception of luminance errors is proportional to the logarithm of luminance. See e.g. [1], [2] and [13]. Hence, the inventor(s) designed a color difference formula ΔE based on the following equation:

$$\Delta E(S,S')=\sqrt{k_1(\Delta \ln B)^2+k_2(\Delta e^2+\Delta f^2)} \quad (9)$$

where

S=(B,e,f), S'=(B',e',f'),

Δ ln B=ln B−ln B'

Δe=e−e'

Δf=f−f'

$k_1$ and $k_2$ are positive constants.

More particularly, the inventor(s) looked for values of $k_1$ and $k_2$ that would optimize ΔE(S,S') with respect to the non-uniformity coefficient (7). The result was $k_1$=900 and $k_2$=10000, i.e. the color difference formula was as follows:

$$\Delta bef(S,S')=100\sqrt{\Delta b^2+\Delta e^2+\Delta f^2} \quad (10)$$

where b=0.3 ln B b'=0.3 ln B'

Δb=b−b'

This color difference formula suggests using a CCS with coordinates b, e, f for quantization. This bef CCS can be defined as the following transformation of Bef:

$$b=0.3 \ln B \quad (11)$$

e, f as in Bef.

Conversion from bef to Bef can be accomplished as follows:

$$B=\exp\{b/0.3\} \quad (12)$$

e, f as in bef

Here "exp" is the exponential function, i.e. the power of the base of the natural logarithm. This base is commonly denoted as "e" and should not be confused with Bef's color coordinate e.

Conversion from bef to DEF2 can be accomplished as follows:

$$B=\exp\{b/0.3\}$$

$$E=e \cdot B$$

$$F=f \cdot B$$

$$D=\sqrt{B^2-E^2-F^2}.$$

The b coordinate is undefined if B=0. In real life there is no light with B=0 because absolute darkness is not believed to exist, but absolute darkness is possible in art. The problem may be fixed by replacing zero B with a small constant in (11), or by using the following CCS instead of (11), for some parameter $B_0$:

$$b = 0.3(\ln(B/B_0)+1) \text{ if } B > B_0 \quad (13)$$

$$b = 0.3 B/B_0 \text{ if } B \leq B_0$$

e, f as in Bef.

In some embodiments, in the range $B \leq B_0$, the e and f coordinates are defined somewhat differently in bef (these e and f coordinates will sometimes be denoted below as $e_{bef}$, $f_{bef}$ to avoid confusion with the e and f coordinates in Bef). More particularly:

If $B > B_0$ $$e_{bef} = e = E/B \text{ and } f_{bef} = f = F/B$$

If $B \leq B_0$ (and hence $b = 0.3 B/B_0$), then:

any of the following expressions can be used for $e_{bef}$:

$$e_{bef} = E/B_0 = e \cdot B/B_0 = e \cdot b/0.3$$

any of the following expressions can be used for $f_{bef}$:

$$f_{bef} = F/B_0 = f \cdot B/B_0 = f \cdot b/0.3 \quad (13A)$$

End of Equations (13A)

Compared to (13), use of equations (13A) for $B \leq B_0$ avoids division by small values of B in computation of $e_{bef}$ and $f_{bef}$ from E and F. Division by small B values as in (13) may result in large jumps in the $e_{bef}$ and $f_{bef}$ values when B changes by a small amount. These large jumps in the chromatic coordinates do not correlate well with human visual perception because humans do not have high chromatic sensitivity in the low brightness range. This poor correlation with the human visual perception is inconsistent with the idea of discarding unnoticeable or poorly noticeable differences to obtain a high compression ratio. Therefore, if (13A) is used, then a larger quantization step can sometimes be used in the range $B \leq B_0$ without image degradation. Further, compression ratio is improved regardless of whether or not the bef data are quantized. In addition, some image capture devices inject particularly large noise into the chromatic information when B is small. If (13) is used, then this noise becomes magnified by division by small B values. Consequently, the signal-to-noise ratio is degraded, and also effective noise filtering is more difficult to achieve.

In case of (13), conversion from bef to Bef can be accomplished as follows:

$$B = B_0 \cdot \exp(b/0.3-1) \text{ if } b > 0.3$$

$$B = B_0 \cdot b/0/3 \text{ if } b \leq 0.3 \quad (14)$$

e, f as in bef

In case of (13A), the B coordinate is determined as in (14). If $b > 0.3$ or $b = 0$, then the e and f coordinates are determined as in (14). If $0 < b \leq 0.3$, then the e and f coordinates are determined as follows. Any of the following expressions can be used for e:

$$e = e_{bef} B_0/B = 0.3 \cdot e_{bef}/b$$

Any of the following expressions can be used for f:

$$f = f_{bef} B_0/B = 0.3 \cdot f_{bef}/b$$

If $b \leq 0.3$, the E and F coordinates can be computed from $e_{bef}$ and $f_{bef}$ as follows:

$$E = e_{bef} B_0$$

$$F = f_{bef} B_0$$

The parameter $B_0$ can be adjusted according to the user's preference. In some embodiments, $B_0$ is set to the maximum physical luminance at which the sensitivity of the human visual system is still not reduced by activation of an adaptation mechanism (an automatic gain control). This luminance is believed to be about 1 cd/m². See [14]. Alternatively, $B_0$ can be set to the minimal value of the brightness range in which the guaranteed quantization precision is desirable.

The computation complexity of either (11), (13), or (13A) is similar to CIE76 and is significantly lower than CIEDE2000. Also, with $\Delta$bef there are no illuminant choice problems when the scene has different lighting sources (in contrast, the CIELAB coordinates are referenced to an illuminant).

Figure 4:
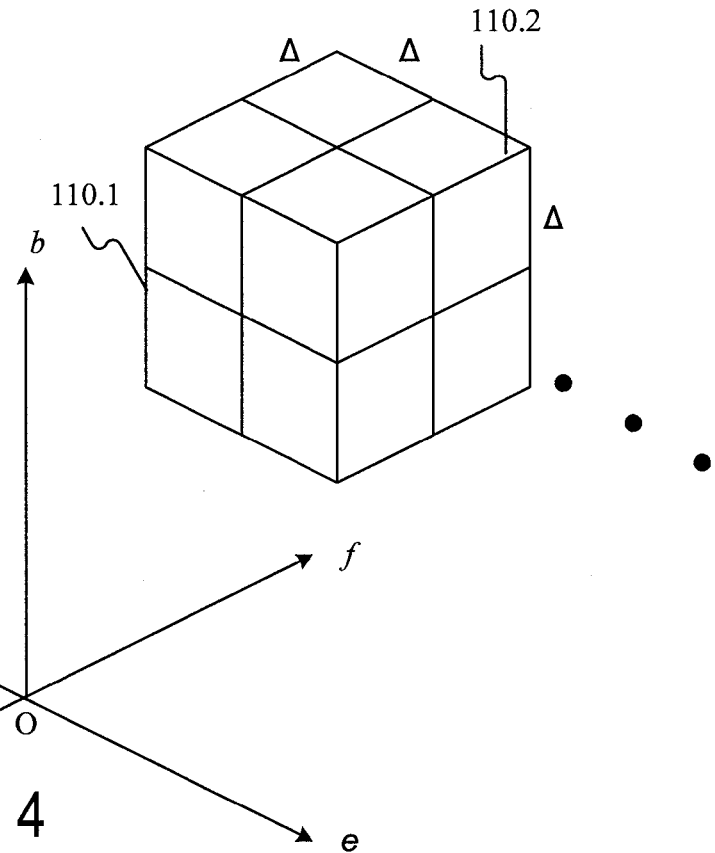
FIG. 4 illustrates decomposition of a set of colors into cells for quantization of digital image data according to some embodiments of the present invention.

FIG. 4 illustrates quantization cells 110 in a bef CCS chosen according to (11), (13) or (13A). Each coordinate b, e, f (i.e. b, $e_{bef}$, $f_{bef}$) is quantized with the same, constant step $\Delta = \Delta b = \Delta e = \Delta f$. Therefore, each cell 110 is a cube of side $\Delta$. Assuming that each cell's representative stimulus 120 is the cell's center, the maximum Euclidian distance between the stimuli 120 of adjacent cells 110 is $$\max \sqrt{(\Delta b)^2 + (\Delta e)^2 + (\Delta f)^2} = \Delta \sqrt{3} \quad (15)$$

(this maximum is reached if the cells 110 share only one vertex, as do for example the cells 110.1 and 110.2 in FIG. 4). Denoting the Euclidean distance $\sqrt{(\Delta b)^2 + (\Delta e)^2 + \Delta f)^2}$ as $\Delta_E$bef, and noting from (10) that $$\Delta_E \text{bef} = \Delta \text{bef}/100 \quad (16)$$

we see from (15) that the maximum $\Delta$bef distance between the adjacent cells is $$100\Delta\sqrt{3} \quad (17)$$

If (13) or (13A) is used, the quantization step $\Delta b$ may or may not be chosen separately for $B \leq B_0$, i.e. $b \leq 0.3$.

In case of (11) and also in the "logarithmic range" $b > 0.3$ in (13) or (13A), the cell size is relatively uniform when measured in McA, as the cells' linear dimensions vary by a factor of at most 3.43 (see Table 1). Due to this uniformity, the size of the quantized data can be made smaller than in CIELAB, RGB, or XYZ color coordinate systems for the same quantization accuracy.

Also, the representative values of each coordinate b, e, f can be indexed by consecutive integers in increasing order (e.g. $b_1 < b_2 < b_3 < \ldots$; $e_1 < e_2 < e_3 < \ldots$; $f_1 < f_2 < f_3 < \ldots$), and each representative stimulus 120 with coordinates ($b_i$, $e_j$, $f_k$) can be assigned an index (i,j,k). In this case, the adjacent cells will have their index components i, j, k differ by at most 1. This property facilitates decorrelation in some algorithms.

In some embodiments, the representative stimuli are coded as integers. Regardless of whether or not the starting (non-quantized) bef coordinates are coded as floating-point numbers or integers, the quantization can be accomplished by multiplying the coordinates by some number C and rounding the result. Denoting the quantized coordinates as $b_q$, $e_q$ and $f_q$ respectively, the quantization of a color stimulus (b,e,f) can be accomplished by the following computations:

$$b_q = \text{Round}(bC)$$

$$e_q = \text{Round}(eC)$$

$$f_q = \text{Round}(fC) \quad (18)$$

The function Round(·) represents rounding to the nearest integer. The half-integers can be rounded according to any suitable convention. For example, in some embodiments the half-integers are rounded up if they are positive, down if they are negative:

$$\text{Round}(x) = \lfloor x + \tfrac{1}{2} \rfloor \text{ if } x \geq 0$$

$$\text{Round}(x) = \lceil x - \tfrac{1}{2} \rceil \text{ if } x < 0.$$

$\lceil \cdot \rceil$ is the ceiling function, i.e. $\lceil x \rceil$ is the smallest integer greater than or equal to x. Alternatively, the rounding can be down (to the nearest integer not exceeding x) or according to some other rule.

The quantization accuracy is defined by the size of cells 110 which in turn is defined by the C parameter. Clearly, if the rounding is to the nearest integer, then $$\Delta = 1/C \tag{19}$$

In case of (13) or (13A), the C parameter can be the same or different for the linear and logarithmic ranges.

The inventor(s) have determined the boundary value $C=C_0$ at which the maximum distance between the representative color stimuli 120 of the adjacent cells 110 is 1 McA. This value $C_0=239$. The $C_0$ value was determined assuming the bef definition (11). The same $C_0$ value is also valid in the logarithmic range for (13) or (13A) assuming that $B_0$ is sufficiently small. Indeed, as explained below, the $C_0$ value was determined by analyzing all the 28 indistinguishability ellipsoids mentioned hereinabove and described in [3]. The $C_0$ value is valid in the logarithmic range for (13) or (13A) if these ellipsoids lie in the region $B > B_0$.

The $C_0$ value was determined as follows. For each ellipsoid, the inventor(s) considered a cube in bef centered at the center of the ellipsoid and having a side length $\Delta$, and considered the 26 adjacent cubes having the same side length $\Delta$. The inventor(s) calculated the maximum $\Delta$ value for which the cubes' centers would lie in the ellipsoid. The maximum $\Delta_M$ of such $\Delta$ values was computed over all the ellipsoids, and was inverted pursuant to (19) to obtain the corresponding C value. We will denote this C value as $C_{0e}$. It is a fractional value slightly smaller than 239, but is equal to 239 when rounded to the nearest integer.

Clearly, if $C \geq C_0$, the centers of the representative stimuli 120 of the adjacent cells are guaranteed to be visually indistinguishable (assuming of course that the indistinguishability regions, still unknown, for the stimuli other than those studied in [3] are at least as large, when measured in $\Delta$bef, as a ball of a diameter equal to the minimal axis in [3]). The maximum data representation error is the $\Delta$bef length of a half diagonal of a cube 110 with a side $\Delta_M$, i.e.

$$100\Delta_M\sqrt{3}/2 \tag{20}$$

(note (16)). Since $\Delta_M$ is about $1/C_b = 1/239$, the value (20) is about 0.37.

For C=239, the inventor(s) considered cells 110 centered at the centers of the 28 indistinguishability ellipsoids. For each such cell, the inventor(s) calculated the McA distances between the cell's center and the centers of the 26 adjacent cells 110 having the same dimensions as the center cell. The average of all such distances over all the ellipsoids was 0.56 McA, and the minimum distance was 0.227 McA. The maximum distance was 1 McA as explained above. The ratio of the maximum distance to the average distance was thus less than 2, indicating good uniformity of decomposition into cells 110.

Some embodiments allow a user to specify the C value as a variable precision parameter. In other embodiments, the user can specify the relative parameter p:

$$p = C_0/C \tag{21}$$

Visual lossiness corresponds approximately to p=1 (actually visual lossiness corresponds to $p = C_0/C_{0e}$, but this parameter differs from 1 by less than 0.5/239). The maximum distance between a cell's center and the centers of the 26 adjacent cells is about p McA (more precisely, $p \cdot C_{0e}/C_0$ McA, but the coefficient $C_{0e}/C_0$ differs from 1 by less than 0.5/239). The maximum data representation error $\Delta$bef is about 0.37·p (or $0.37 \cdot p \cdot C_{0e}/C_0$). The inventor(s) believe that it is usually preferable to limit the p values to the interval [0.1, 2].

It follows from (19) and (21) that:

$$\Delta = p/C_0 \tag{22}$$

and it follows from (17) that the maximum $\Delta$bef distance between the centers of the adjacent cells is:

$$100(p/C_0)\sqrt{3}$$

Thus, the p parameter defines both the quantization step $\Delta$ and the maximum distance between the adjacent cells in $\Delta$bef and in MacAdams.

Comparative Testing

The quantized bef representation was compared with two HDR formats—OpenEXR and Radiance HDR (RGBE)—implemented in a computer program called Adobe® Photo-Shop® CS3 and available from Adobe Inc. The testing focused on the precision of color vector representation and on the compression rate. The three formats were tested one after another on the same set of HDR images represented in linear-sRGB floating point TIFF (96 bpp). Twenty-eight images were selected for the testing as follows:

Six images were created in PhotoShop from a series of shots made with various expositions and saved as RAW.

Ten popular HDR images with various scenes (such as Apartment, Golden Gate, and Memorial) were downloaded from the Internet. Unfortunately, these images had insufficient data precision, so the inventor(s) added a small noise (about 1%) to each image to arbitrarily fill the lower order bits.

Another ten images were created from the aforementioned set of ten HDR images by increasing image saturation in order to get pictures with out-of-sRGB-gamut colors.

In addition, the inventor(s) synthesized two HDR images: an image containing all visible colors and an image containing all (and only) sRGB gamut colors.

To calculate the compression rate and the maximum error (for all pixels of an image) in color vector representation the following procedure was applied to every image:

1. The linear-sRGB floating point TIFF image was quantized into the compressed HDR image.

2. Image compression rate was calculated as an averaged number of bits per pixel in the compressed image.

3. The compressed image was converted back into linear-sRGB floating point TIFF.

4. The image obtained at the previous stage 3 was compared pixel by pixel with the initial linear-sRGB floating point TIFF image and the maximum of the $\Delta$bef color difference was calculated.

The results are illustrated in FIG. 5. The horizontal axis indicates the median error which is the median of the maximum $\Delta$bef errors calculated for the individual images at step 4. The vertical axis indicates the bits per pixel calculated at step 2.

Radiance HDR (RGBE)

In RGBE format coordinates cannot take negative values. This causes errors in HDR image description when a scene has colors out of the sRGB gamut. For images with out-of-sRGB-gamut stimuli, the color difference error reaches 72

Δbef. Such images have been excluded from the median error calculation illustrated in FIG. 5.

For the 16 images without out-of-sRGB-gamut colors, the median of maximal errors Δbef was 0.54.

The compression rate for RGBE format was 25 bits per pixel (3.8 times image size reduction versus linear-sRGB floating point TIFF).

OpenEXR

The test revealed abnormally high errors (up to 20 Δbef) for some images with high noise level in shadowed areas. Such images were excluded from the median error calculation.

The median of the maximal Δbef errors for the remaining 16 images was 0.04.

The compression rate for OpenEXR format was 28 bits per pixel (3.4 times image size reduction versus linear-sRGB floating point TIFF).

bef

The bef coordinates were defined by (11). The bef method provides the option of increasing the compression rate by reducing data precision. Experiments have shown that changing the parameter p (see (21)) from 0.1 to 2 leads to the image size reduction by the factor of two. To create "an equal opportunity" condition for the compression rate comparison, the precision of color vector representation in bef (the p parameter) was varied to meet the precision of the counterpart format. The "bef" line in FIG. 5 was obtained for the p values from 0.1 (at the left end of the line) to 1.5 (at the right end).

The bold vertical line in FIG. 5 at Δbef=0.37 corresponds to p=1 and separates the lossless area from the lossy area. As shown in FIG. 5, OpenEXR provides visual lossless compression, while RGBE compressed images may have posterization artifacts.

At p=1.5 the accuracy of the bef format is the same as the RGBE accuracy, while the compression provided by bef is 11 bit per pixel (8.8 times image size reduction versus linear-sRGB floating point TIFF), which outperforms RGBE by more than two times.

At p=0.1 the accuracy of the bef format is the same as OpenEXR accuracy, while the compression provided by bef is 20.5 bit per pixel (4.7 image size reduction versus linear-sRGB floating point TIFF), which is 27% better than OpenEXR's.

Unlike RGBE or OpenEXR, the bef format provided equally good compression results for the 28 test images.

Thus, the bef CCS can represent all visible colors and is suitable for HDR images. The range and quality of the bef characteristics suggest bef as highly suitable for archiving of digital images, especially HDR images.

FIG. 6 illustrates an exemplary format for storage or transmission of the bef data. Variable precision parameters (e.g. p or C for the logarithmic range, and possibly other parameters for the linear range if (13) or (13A) is used) are stored in a field 610. The quantized data are stored in a field 620, possibly as the $b_q e_q f_q$ values (18) or in some other encoding, e.g. variable length encoding. If desired, the $b_q e_q f_q$ decorrelation (e.g. a wavelet transform) or other types of processing can be applied to $b_q e_q f_q$ data, and the field 620 may contain an encoding of the processed (e.g. decorrelated) data.

FIG. 7 illustrates a computer system 710 suitable for digital data processing to obtain the bef representation or the quantized $b_q e_q f_q$ representation. The computer system may include one or more computer processors 712 which execute computer instructions, and may also include computer storage 714 (including possibly magnetic, optical, semiconductor, and/or other types of storage, known or to be invented). If data display is desired, the system may include one or more display devices 716 (e.g. monitors, printers, or some other type, known or to be invented). If a network connection is desired, network interface 717 can be provided to connect the computer system to a network segment 720. Image data and computer programs manipulating the data (such as programs that perform the methods described herein) can be stored in storage 714 and/or read over a network.

The invention is not limited to the embodiments described above.

Some embodiments provide an apparatus-implemented method for image processing. The method comprises converting a digital image between a first digital representation of the image and a second digital representation of the image. For example, the first digital representation may be bef or some other representation. The first digital representation's coordinates will be denotes $s_1, s_2, s_3$, where $s_1$ may or may not be b and where $s_2$ and $s_3$ may or may not be $e_{bef}$ and $f_{bef}$. The second digital representation may be Bef, DEF2, XYZ, RGB, or may be any other representation. In the first digital representation, the coordinates $s_1, s_2, s_3$ are related to a linear color coordinate system (CCS) $T_1 T_2 T_3$. In some embodiments, $T_1 T_2 T_3$ is DEF2, where $T_1$=D, $T_2$ is one of E and F, and $T_3$ is the other one of E and F. However, the linear CCS $T_1 T_2 T_3$ may be other than DEF2. In some embodiments, $T_1$ represents white color (i.e. if a color has a non-zero coordinate $T_1$ and zero coordinates $T_2$ and $T_3$, then the color is white), but this is not necessary. In some embodiments, $T_1 T_2 T_3$ is orthonormal, but this is not necessary. The image which is converted between the first and second digital representations comprises a plurality of image portions (e.g. pixels or some other portions), and each portion has some color coordinates $T_1, T_2, T_3$ in the linear CCS. The relationship between $T_1 T_2 T_3$ and $s_1 s_2 s_3$ is such that, at least if the value $$S_1 = \sqrt{T_1^2 + T_2^2 + T_3^2}$$

is in a predefined range (e.g. the range $S_1 > B_0$ or $S_1 \geq B_0$ where $B_0$ is some non-negative value), then:

$$s_1 = c_1 \cdot (\ln(c_2 S_1 + c_3) + c_4)$$

$$s_2 = c_5 \cdot T_2 / S_1$$

$$s_3 = c_6 \cdot T_3 / S_1$$

wherein $c_1, c_2, c_3, c_4, c_5, c_6$ are predefined constants independent of the image portion, wherein $c_1, c_2, c_5, c_6$ are not zero, $c_2$ is positive, and each of $|C_1/c_5|$ and $|c_1/c_6|$ is at least 0.25 and at most 0.35. For example, in (11), $c_1$=0.3, $c_2$=1, $c_3$=$c_4$=0, $c_5$=$c_6$=1. In (13) or (13A), $c_1$=0.3, $c_2$=1/$B_0$, $c_3$=0, $c_4$=$c_5$=$c_6$=1. Other values are also constants other than $c_2$ may be negative.

The coordinates $s_1, s_2, s_3$ may be represented, for example, in floating-point format (i.e. with separate representation of exponent and mantissa) or in integer format (i.e. fixed-point format, possibly including a fractional part after the binary point). The invention is not limited to any particular representation. The coordinates $s_1, s_2, s_3$ may have been obtained via quantization or may be originally captured or constructed data, or obtained in some other way. The invention is thus not limited to quantization or to actually using the coordinates $T_1$, $T_2, T_3$ or the value $S_1$.

In some embodiments, in the visible gamut, any color for which $T_2$ and $T_3$ are zero and $T_1$ is not zero is a white color, and the linear CCS is 70%-orthonormal.

In some embodiments, in at least said range of $S_1$ values, the color coordinates $s_1, s_2, s_3$ are all represented with the same precision, i.e. the maximum representation error is the same. The color coordinates $s_1, s_2, s_3$ may however differ in the number of bits. For example, in the bef representation, the b coordinate may be allocated more bits than each of the e and f coordinates because the brightness logarithm ln B may have a greater range than either e or f.

In some embodiments, said range of $S_1$ values is a range of all possible values of the color coordinate $S_1$ (see e.g. (11) or (12)). In other embodiments, said range comprises a range of all values greater than a predefined positive number $B_0$, and for each said image portion whose value $S_1$ is below $B_0$, the first digital representation comprises color coordinates $s_1$, $s_2$, $s_3$ such that:

$$s_2 = c_7 \cdot T_2$$

$$s_3 = c_8 \cdot T_3$$

wherein $c_7$, $c_8$ are predefined non-zero constants independent of the image portion. For example, in (13A), $c_7 = c_8 = 1/B_0$. The constants $c_7$, $c_8$ can be chosen so that the functions $s_2$ and $s_3$ are continuous at $B = B_0$, i.e. for $B = B_0$ the same values are provided for the coordinates $s_2$ and $s_3$ by the computation for $B > B_0$ as by the computation for $B < B_0$.

In some embodiments, for each said image portion whose value $S_1$ is below $B_0$, $$s_1 = c_9 \cdot S_1$$

wherein $c_9$ is a predefined constant independent of the image portion. For example, in (13), $c_9 = 0.3/B_0$. The constant $c_9$ can be chosen to make the function $s_1$ continuous at $B = B_0$.

In some embodiments, the second digital representation is a representation in the linear CCS (e.g. DEF2) or in a CCS defined by color coordinates $S_1$, $T_2/S_1$, $T_3/S_1$ (e.g. Bef).

In some embodiments, the method comprises conversion from the second digital representation to the first digital representation. The conversion comprises obtaining a parameter (e.g. p or C) specifying, for at least said range, a maximum desired distance ("MDD") between centers of adjacent quantization cells in units of human visual perception. The units can be McA (as when the parameter is p or rather $p \cdot C_{0e}/C_0$), or $McA^2$ (as when the parameter is $p^2$ or rather $(p \cdot C_{0e}/C_0)^2$), or some other strictly increasing function of McA (e.g. a multiple of McA). The parameter can be a value of said MDD or a value inverse to said MDD (as when the parameter is C and the unit is $C_{0e}$ McA). In said units, a predefined value is assigned to a distance between any two color stimuli which differ by a just noticeable difference. For example, if the unit is McA or $McA^2$, then the predefined value is 1; if the unit is ln McA (natural logarithm of McA), then the predefined value is 0; if the unit is $C_{0e}/C_0$ McA, the predefined value is $C_{0e}/C_0$; and so on.

The color coordinates $s_1$, $s_2$, $s_3$ are then obtained from the second digital representation in a quantized form, wherein in at least said range, the maximum distance between centers of adjacent quantization cells for the quantized form in said units of human visual perception is a function of said parameter. For example (15) is a function of C or p (see (21) and (22)).

In some embodiments, a quantization step $\Delta$ which is a function of said parameter.

Some embodiments provide a computer-readable manufacture comprising computer-readable encoding of digital data representing an image at a plurality of image portions. The manufacture can be or include part of a computer system (e.g. a computer disk), or an entire computer system. The manufacture can be or include removable computer storage, e.g. removable disks or other types of storage, such as sued for archiving of digital images. These examples do not limit the types of manufacture. At each said image portion the image has color coordinates $T_1$, $T_2$, $T_3$ in a predefined linear color coordinate system (CCS), e.g. DEF2. At least for each said image portion whose color coordinates $T_1$, $T_2$, $T_3$ are such that a value $$S_1 = \sqrt{T_1^2 + T_2^2 + T_3^2}$$

is in a predefined range, the digital data comprise color coordinates $s_1$, $s_2$, $s_3$ such that:

$$s_1 = c_1 \cdot (\ln(c_2 S_1 + c_3) + c_4)$$

$$s_2 = c_5 \cdot T_2/S_1$$

$$s_3 = c_6 \cdot T_3/S_1$$

wherein $c_1$, $c_2$, $c_3$, $c_4$, $c_5$, $c_6$ are predefined constants independent of the image portion, wherein $c_1$, $c_2$, $c_5$, $c_6$ are not zero, $c_2$ is positive, and each of $|c_1/c_5|$ and $|c_1/c_6|$ is at least 0.25 and at most 0.35. The encoding comprises an encoding of the color coordinates $s_1$, $s_2$, $s_3$ all represented, in at least said range, with the same precision.

In some embodiments, the encoding is an encoding of an integer representation of the color coordinates $s_1$, $s_2$, $s_3$ of the image portions.

In some embodiments, the color coordinates $s_1$, $s_2$, $s_3$ for said image portions are in a quantized form; and the manufacture further comprises a computer readable parameter specifying for the quantized form, for at least said range, one or both of (i) and (ii) wherein (i) and (ii) are as follows:

(i) a maximum desired distance ("MDD") between centers of adjacent quantization cells in units of human visual perception, the parameter being a value of said MDD or a value inverse to said MDD, wherein in said units, a predefined value is assigned to a distance between any two color stimuli which differ by a just noticeable difference;

(ii) a quantization step for at least one of the coordinates $s_1$, $s_2$, $s_3$ in the units of human visual perception, the parameter being a value of said quantization step or a multiple of said quantization step or an inverse of said quantization step or of the multiple of said quantization step.

In some embodiments, the encoding comprises variable length encoding of decorrelation coefficients representing the color coordinates $s_1$, $s_2$, $s_3$.

Some embodiments provide an apparatus-implemented method for quantizing of digital image data, the method comprising: obtaining a parameter specifying, for at least a range of color stimuli, a maximum desired distance ("MDD") between centers of adjacent quantization cells in units of human visual perception, the parameter being a value of said MDD or a value inverse to said MDD, wherein in said units, a predefined value is assigned to a distance between any two color stimuli which differ by a just noticeable difference; and quantizing the digital image data, wherein in at least said range, in said units of human visual perception, the maximum distance between centers of adjacent quantization cells is a function of said parameter.

In some embodiments, the quantizing comprises separate quantization of each color coordinate, and in at least said range, each of the coordinates is quantized with a quantization step $\Delta$ which is a function of said parameter.

Some embodiments provide an apparatus-implemented method for image processing, the method comprising converting a digital image between a first digital representation of the image and a second digital representation of the image, wherein the image comprises a plurality of image portions, wherein for each said image portion the first digital representation comprises color coordinates $s_1$, $s_2$, $s_3$ such that for some predefined constants $c_1$, $c_2$, $c_3$, $c_4$, $c_5$, $c_6$, $c_7$, $c_8$, $c_9$, $b_0$ which are independent of the image portion and are such that (i) $c_1$, $c_2, c_5, c_6, c_7, c_8, c_9, b_0$ are not zero and (ii) $c_2$ and $b_0$ are positive, the following conditions (1) and (2) are true:

(1) a value $S_1$ is non-negative, wherein $S_1$ is such that:
(1A) if $s_1 > b_0$, then $S_1 = \{[\exp(s_1/c_1 - c_4)] - c_3\}/c_2$
(1B) if $s_1 < b_0$, then $S_1 = s_1/c_9$
(if $s_1 = b_0$, then $S_1$ may be undefined or defined as in (1A) or (1B) or in some other way);

(2) for each said image portion, values $T_1$, $T_2$, $T_3$ defined below are color coordinates in a linear color coordinate system independent of the image portion, wherein the values $T_1$, $T_2$, $T_3$ are defined as follows:

$$T_2 = s_2/c_7$$

$$T_3 = s_3/c_8$$

$$T_1 = \sqrt{S_1^2 - T_2^2 - T_3^2}$$

Some embodiments provide an apparatus-implemented method for determining a color difference between two color stimuli S and S', wherein in a predefined color coordinate system (CCS) $s_1 s_2 s_3$, the color stimulus S has coordinates $(s_1, s_2, s_3)$ and the color stimulus S' has coordinates $(s_1', s_2', s_3')$, wherein the CCS $s_1 s_2 s_3$ is related to a CCS $S_1 S_2 S_3$ via a transformation $$s_1 = c_1 \cdot (\ln(c_2 S_1 + c_3) + c_4)$$

$$s_2 = S_2/S_1$$

$$s_3 = S_3/S_1$$

wherein $c_1, c_2, c_3, c_4$ are predefined constants, wherein $c_1$ is at least 0.25 and at most 0.35, and $c_2$ is positive;

wherein the CCS $S_1 S_2 S_3$ is related to a 70%-orthonormal linear CCS $T_1 T_2 T_3$ via a transformation:

$$S_1 = \sqrt{T_1^2 + T_2^2 + T_3^2}$$

$$S_2 = T_2/S_1$$

$$S_3 = T_3/S_1$$

the method comprising determining, by said apparatus, a value $$\Delta E(S, S') = k_0 \sqrt{\Delta s_1^2 + \Delta s_2^2 + \Delta s_3^2}$$

where $$\Delta s_1 = s_1 - s_1'$$

$$\Delta s_2 = s_2 - s_2'$$

$$\Delta s_3 = s_3 - s_3'$$

wherein $k_0$ is a predefined positive constant (for example, $k_0$ may be 100 as in (10) or some other value).

Some embodiments provide an apparatus for performing any of the methods described above (e.g. the hardwired and/or software programmable circuitry described above). Some embodiments include a computer-readable manufacture (e.g. computer disks or some other type) comprising a computer program operable to cause a computer system to perform any of the methods described above. Some embodiments include a network transmission method comprising transmitting a computer program over a network segment, the computer program being operable to cause a computer system to perform any of the methods described above.

The embodiments defined above do not limit the invention except as defined by the appended claims.

References. The references listed below are not necessarily prior art with respect to this patent application. The references are incorporated herein by reference:

[1] "The LogLuv Encoding for Full Gamut, High Dynamic Range Images", Silicon Graphics, Inc. Mountain View, Calif.

[2] Larson, G. W., "Overcoming Gamut and Dynamic Range Limitations in Digital Images," IS&T/SID 6$^{th}$ Color Imaging Conference (1998).

[3] Wyszecki & Stiles, Color Science (2$^{nd}$ Ed. 2000), pages 306-330, 793-803, 825-830.

[4] S. Bezryadin et al. *Local Criterion of Quality for Color Difference Formula*, IS&T Printing Technology SPb'06, pages 140-144 (2006).

[5] U.S. patent application Ser. No. 11/322,111 filed Dec. 28, 2005 by S. Bezryadin, published as no. US 2007-0146746 A1 on Jun. 28, 2007, now U.S. Pat. No. 7,495,800, issued Feb. 24, 2009.

[6] U.S. patent application Ser. No. 11/321,443 filed Dec. 28, 2005 by S. Bezryadin, published as no. US 2007-0146745 A1 on Jun. 28, 2007, now U.S. Pat. No. 7,489,420, issued Feb. 10, 2009.

[7] U.S. patent application Ser. No. 11/377,161 filed Mar. 16, 2006 by S. Bezryadin, published as no. US 2007-0146748 A1 on Jun. 28, 2007, now U.S. Pat. No. 7,486,418, issued Feb. 3, 2009.

[8] U.S. patent application Ser. No. 11/376,837 filed Mar. 16, 2006 by S. Bezryadin, published as no. US 2007-0146747 A1 on Jun. 28, 2007, now U.S. Pat. No. 7,495,801, issued Feb. 24, 2009.

[9] U.S. patent application Ser. No. 11/377,591 filed Mar. 16, 2006 by S. Bezryadin, published as no. US 2007-0146749 A1 on Jun. 28, 2007, now U.S. Pat. No. 7,486,419, issued Feb. 3, 2009.

[10] U.S. patent application Ser. No. 11/494,393 filed Jul. 26, 2006 by S. Bezryadin, published as no. US 2007-0154083 A1 on Jul. 5, 2007, now U.S. Pat. No. 7,639,396, issued Dec. 29, 2009.

[11] U.S. patent application Ser. No. 11/432,221 filed May 10, 2006 by S. Bezryadin, published as no. US 2007-0146831 A1 on Jun. 28, 2007, now U.S. Pat. No. 7,589,866, issued Sep. 15, 2009.

[12] S. Bezryadin et al., *Color Coordinate System for Accurate Color Image Editing Software*, IS&T Printing Technology SPb'06, pages 145-148 (2006).

[13] Rafal Mantiuk, Karol Myszkowski, Hans-Peter Seidel, "Lossy Compression of High Dynamic Range Images and Video", Proceedings of SPIE, Volume 6057 (2006).

[14] U.S. patent application Ser. No. 11/564,730 filed Nov. 29, 2006 by S. Bezryadin, published as no. US 2008-0123942 A1 on May 29, 2008, now U.S. Pat. No. 7,929,753, issued Apr. 19, 2011.

The invention claimed is:

1. An apparatus-implemented method for image processing, the method comprising converting a digital image between a first digital representation of the image and a second digital representation of the image, wherein the image comprises a plurality of image portions, wherein at each said image portion the image has color coordinates $T_1, T_2, T_3$ in a predefined linear color coordinate system (CCS);

wherein at least for each said image portion whose color coordinates $T_1, T_2, T_3$ are such that a value $$S_1 = \sqrt{T_1^2 + T_2^2 + T_3^2}$$

is in a predefined range, the first digital representation comprises color coordinates $s_1, s_2, s_3$ such that:

$$s_1 = c_1 \cdot (\ln(c_2 S_1 + c_3) + c_4)$$

$$s_2 = c_5 \cdot T_2/S_1$$

$$s_3 = c_6 \cdot T_3/S_1$$

wherein $c_1, c_2, c_3, c_4, c_5, c_6$ are predefined constants independent of the image portion, wherein $c_1, c_2, c_5, c_6$ are not zero, $c_2$ is positive, and each of $|c_1/c_5|$ and $|c_1/c_6|$ is at least 0.25 and at most 0.35.

2. The method of claim 1 wherein in a visible gamut, any color for which $T_2$ and $T_3$ are zero and $T_1$ is not zero is a white color, and the linear CCS is 70%-orthonormal.

3. The method of claim 1 wherein in at least said range, the color coordinates $s_1, s_2, s_3$ are all represented with the same precision.

4. The method of claim 2 wherein in at least said range, the color coordinates $s_1, s_2, s_3$ are in integer format.

5. The method of claim 2 wherein each of $|c_1/c_5|$ and $|c_1/c_6|$ is 0.3.

6. The method of claim 2 wherein $c_3=0$.

7. The method of claim 2 wherein said range is a range of all possible values of the color coordinate $S_1$.

8. The method of claim 2 wherein said range comprises a range of all values greater than a predefined positive number $B_0$, and for each said image portion whose value $S_1$ is below $B_0$, the first digital representation comprises color coordinates $s_1, s_2, s_3$ such that:

$$s_2 = c_7 \cdot T_2$$

$$s_3 = c_8 \cdot T_3$$

wherein $c_7, c_8$ are predefined non-zero constants independent of the image portion.

9. The method of claim 8 wherein for each said image portion whose value $S_1$ is below $B_0$, $$s_1 = c_9 \cdot S_1$$

wherein $c_9$ is a predefined constant independent of the image portion.

10. The method of claim 2 wherein the linear CCS is an orthonormal CCS with coordinate axes D, E, F, wherein:
a positive half of the D axis corresponds to day light;
a positive half of the E axis corresponds to monochromatic red; and
a positive half of the F axis corresponds to yellow; and
wherein $T_1 = D$.

11. The method of claim 2 wherein the second digital representation is a representation in the linear CCS or in a CCS in which each color has color coordinates $S_1, T_2/S_1, T_3/S_1$.

12. The method of claim 1 wherein said converting comprises:
obtaining the second digital representation;
obtaining a parameter specifying, for at least said range, a maximum desired distance ("MDD") between centers of adjacent quantization cells in units of human visual perception, the parameter being a value of said MDD or a value inverse to said MDD, wherein in said units, a predefined value is assigned to a distance between any two color stimuli which differ by a just noticeable difference; and
obtaining the color coordinates $s_1, s_2, s_3$ from the second digital representation in a quantized form, wherein in at least said range, the maximum distance between centers of adjacent quantization cells for the quantized form in said units of human visual perception is a function of said parameter.

13. The method of claim 12 wherein the unit of human visual perception is McA (MacAdam) or a multiple of McA.

14. The method of claim 12 wherein in at least said range, each of the coordinates $s_1, s_2, s_3$ is quantized with a quantization step $\Delta$ which is a function of said parameter.

15. The method of claim 1 wherein said converting comprises:
obtaining the second digital representation;
obtaining a parameter specifying, for at least said range, a maximum desired distance ("MDD") between centers of adjacent quantization cells in units of human visual perception, the parameter being a value of said MDD or a value inverse to said MDD, wherein in said units, a predefined value is assigned to a distance between any two color stimuli which differ by a just noticeable difference; and
obtaining the color coordinates $s_1, s_2, s_3$ from the second digital representation in a quantized form, wherein in at least said range, each coordinate $s_1, s_2, s_3$ is quantized with a step $\Delta$ which is a function of said parameter.

16. The method of claim 15 wherein the unit of human visual perception is McA (MacAdam) or a multiple of McA.

17. The method of claim 1 wherein said converting comprises converting from the first digital representation to the second digital representation, and the method further comprises providing the second digital representation to a display device, the display device displaying the image.

18. An apparatus implemented method for image processing, the method comprising:
processing, by the apparatus, computer-readable encoding of digital data representing an image at a plurality of image portions, wherein at each said image portion the image has color coordinates $T_1, T_2, T_3$ in a predefined linear color coordinate system (CCS);
wherein at least for each said image portion whose color coordinates $T_1, T_2, T_3$ are such that a value $$S_1 = \sqrt{T_1^2 + T_2^2 + T_3^2}$$

is in a predefined range, the digital data comprise color coordinates $s_1, s_2, s_3$ such that:

$$s_1 = c_1 \cdot (\ln(c_2 S_1 + c_3) + c_4)$$

$$s_2 = c_5 \cdot T_2/S_1$$

$$s_3 = c_6 \cdot T_3/S_1$$

wherein $c_1, c_2, c_3, c_4, c_5, c_6$ are predefined constants independent of the image portion, wherein $c_1, c_2, c_5, c_6$ are not zero, $c_2$ is positive, and each of $|c_1/c_5|$ and $|c_1/c_6|$ is at least 0.25 and at most 0.35;
wherein the encoding comprises an encoding of the color coordinates $s_1, s_2, s_3$ all represented, in at least said range, with the same precision;
wherein the processing comprises at least one of:
editing the image;
displaying the image on a display device;
compressing the encoded digital data;
storing the encoded digital data in a computer-readable manufacture;
reading the encoded digital data from the computer-readable manufacture and transmitting the encoded digital data over a network segment.

19. The method of claim 18 wherein in a visible gamut, any color for which $T_2$ and $T_3$ are zero and $T_1$ is not zero is a white color, and the linear CCS is 70%-orthonormal.

20. The method of claim 19 wherein the linear CCS is an orthonormal CCS with coordinate axes D, E, F, wherein:
a positive half of the D axis corresponds to day light;
a positive half of the E axis corresponds to monochromatic red; and
a positive half of the F axis corresponds to yellow; and wherein $T_1=D$.

21. The method of claim 18 wherein the encoding is an encoding of an integer representation of the color coordinates $s_1, s_2, s_3$ of the image portions.

22. The method of claim 18 wherein each of $|c_1/c_5|$ and $|c_1/c_6|$ is 0.3.

23. The method of claim 18 wherein $c_3=0$.

24. The method of claim 18 wherein said range is a range of all possible values of the color coordinate $S_1$.

25. The method of claim 18 wherein said range comprises a range of all values greater than a predefined positive number $B_0$, and for each said image portion whose value $S_1$ is below $B_0$, the first digital representation comprises color coordinates $s_1, s_2, s_3$ such that:

$$s_2 = c_7 \cdot T_2$$

$$s_3 = c_8 \cdot T_3$$

wherein $c_7, c_8$ are predefined non-zero constants independent of the image portion.

26. The method of claim 25 wherein for each said image portion whose value $S_1$ is below $B_0$, $$s_1 = c_9 \cdot S_1$$

wherein $c_9$ is a predefined constant independent of the image portion.

27. The method of claim 18 wherein the color coordinates $s_1, s_2, s_3$ for said image portions are in a quantized form; and
the digital data further comprise a computer readable parameter specifying for the quantized form, for at least said range, one or both of (i) and (ii) wherein (i) and (ii) are as follows:
(i) a maximum desired distance ("MDD") between centers of adjacent quantization cells in units of human visual perception, the parameter being a value of said MDD or a value inverse to said MDD, wherein in said units, a predefined value is assigned to a distance between any two color stimuli which differ by a just noticeable difference;
(ii) a quantization step for at least one of the coordinates $s_1, s_2, s_3$ in the units of human visual perception, the parameter being a value of said quantization step or a multiple of said quantization step or an inverse of said quantization step or of the multiple of said quantization step.

28. The method of claim 27 wherein the unit of human visual perception is McA (MacAdam) or a multiple of McA.

29. The method of claim 18 wherein the encoding comprises variable length encoding of decorrelation coefficients representing the color coordinates $s_1, s_2, s_3$.

30. An apparatus-implemented method for image processing, the method comprising converting a digital image between a first digital representation of the image and a second digital representation of the image, wherein the image comprises a plurality of image portions, wherein for each said image portion the first digital representation comprises color coordinates $s_1, s_2, s_3$ such that for some predefined constants $c_1, c_2, c_3, C_4, c_5, c_6, c_7, c_8, c_9, b_0$ which are independent of the image portion and are such that (i) $c_1, c_2, c_5, c_6, c_7, c_8, c_9, b_0$ are not zero and (ii) $c_2$ and $b_0$ are positive, the following conditions (1) and (2) are true:
(1) a value $S_1$ is non-negative, wherein $S_1$ is such that:
(1A) if $s_1 > b_0$, then $S_1 = \{[\exp(s_1/c_1 - c_4)] - c_3\}/c_2$
(1B) if $s_1 < b_0$, then $S_1 = \cdot s_1/c_9$
(2) for each said image portion, values $T_1, T_2, T_3$ defined below are color coordinates in a linear color coordinate system independent of the image portion, wherein the values $T_1, T_2, T_3$ are defined as follows:

$$T_2 = s_2/c_7$$

$$T_3 = s_3/c_8$$

$$T_1 = \sqrt{S_1^2 - T_2^2 - T_3^2}.$$

31. The method of claim 30 wherein in a visible gamut, any color for which $T_2$ and $T_3$ are zero and $T_1$ is not zero is a white color, and the linear CCS is 70%-orthonormal.

32. The method of claim 31 wherein the linear CCS is an orthonormal CCS with coordinate axes D, E, F, wherein:
a positive half of the D axis corresponds to day light;
a positive half of the E axis corresponds to monochromatic red; and
a positive half of the F axis corresponds to yellow.

33. An apparatus-implemented method for image processing, the method comprising:
processing, by the apparatus, computer-readable encoding of digital data representing an image at a plurality of image portions wherein for each said image portion the digital data comprise color coordinates $s_1, s_2, s_3$ such that for some predefined constants $c_1, c_2, c_3, c_4, c_5, c_6, c_7, c_8, c_9, b_0$ which are independent of the image portion and are such that (i) $c_1, c_2, c_5, c_6, c_7, c_8, c_9, b_0$ are not zero and (ii) $c_2$ and $b_0$ are positive, the following conditions (1) and (2) are true:
(1) a value $S_1$ is non-negative, wherein $S_1$ is such that:
(1A) if $s_1 > b_0$, then $S_1 = \{[\exp(s_1/c_1 - c_4)] - c_3\}/c_2$
(1B) if $s_1 < b_0$, then $S_1 = \cdot s_1/c_9$
(2) for each said image portion, values $T_1, T_2, T_3$ defined below are color coordinates in a linear color coordinate system independent of the image portion, wherein the values $T_1, T_2, T_3$ are defined as follows:

$$T_2 = s_2/c_7$$

$$T_3 s_3/c_8$$

$$T_1 = \sqrt{S_1^2 - T_2^2 - T_3^2}$$

wherein the processing comprises at least one of:
editing the image;
displaying the image on a display device;
compressing the encoded digital data;
storing the encoded digital data in a computer-readable manufacture;
reading the encoded digital data from the computer-readable manufacture and transmitting the encoded digital data over a network segment.

34. The method of claim 33 wherein in a visible gamut, any color for which $T_2$ and $T_3$ are zero and $T_1$ is not zero is a white color, and the linear CCS is 70%-orthonormal.

35. The method of claim 34 wherein the linear CCS is an orthonormal CCS with coordinate axes D, E, F, wherein:
a positive half of the D axis corresponds to day light;
a positive half of the E axis corresponds to monochromatic red; and
a positive half of the F axis corresponds to yellow.

36. An apparatus-implemented method for determining a color difference between two color stimuli S and S', wherein in a predefined color coordinate system (CCS) $s_1 s_2 s_3$, the color stimulus S has coordinates $(s_1,s_2,s_3)$ and the color stimulus S' has coordinates $(s_1',s_2',s_3')$, wherein the CCS $s_1s_2s_3$ is related to a CCS $S_1S_2S_3$ via a transformation $$s_1=c_1\cdot(\ln(c_2S_1+c_3)+c_4)$$

$$s_2=S_2/S_1$$

$$s_3=S_3/S_1$$

wherein $c_1, c_2, c_3, c_4$ are predefined constants, wherein $c_1$ is at least 0.25 and at most 0.35, and $c_2$ is positive;

wherein the CCS $S_1S_2S_3$ is related to a 70%-orthonormal linear CCS $T_1T_2T_3$ via a transformation:

$$S_1=\sqrt{T_1^2+T_2^2+T_3^2}$$

$$S_2=T_2/S_1$$

$$S_3=T_3/S_1$$

the method comprising determining, by said apparatus, a value $$\Delta E(S,S')=k_0\sqrt{\Delta s_1^2+\Delta s_2^2+\Delta s_3^2}$$

where $$\Delta s_1=s_1-s_1'$$

$$\Delta s_2=s_2-s_2'$$

$$\Delta s_3=s_3-s_3'$$

wherein $k_0$ is a predefined positive constant.

37. The method of claim 36 wherein $k_0=100$.

38. The method of claim 36 wherein $c_1=0.3$.

39. An apparatus comprising one or more computer processors and computer storage storing a computer program for causing the one or more processors to perform the method of claim 1.

40. An apparatus comprising one or more computer processors and computer storage storing a computer program for causing the one or more processors to perform the method of claim 3.

41. An apparatus comprising one or more computer processors and computer storage storing a computer program for causing the one or more processors to perform the method of claim 5.

42. An apparatus comprising one or more computer processors and computer storage storing a computer program for causing the one or more processors to perform the method of claim 7.

43. An apparatus comprising one or more computer processors and computer storage storing a computer program for causing the one or more processors to perform the method of claim 9.

44. An apparatus comprising one or more computer processors and computer storage storing a computer program for causing the one or more processors to perform the method of claim 11.

45. An apparatus comprising one or more computer processors and computer storage storing a computer program for causing the one or more processors to perform the method of claim 13.

46. An apparatus comprising one or more computer processors and computer storage storing a computer program for causing the one or more processors to perform the method of claim 15.

47. An apparatus comprising one or more computer processors and computer storage storing a computer program for causing the one or more processors to perform the method of claim 17.

48. An apparatus comprising one or more computer processors and computer storage storing a computer program for causing the one or more processors to perform the method of claim 18.

49. An apparatus comprising one or more computer processors and computer storage storing a computer program for causing the one or more processors to perform the method of claim 20.

50. An apparatus comprising one or more computer processors and computer storage storing a computer program for causing the one or more processors to perform the method of claim 22.

51. An apparatus comprising one or more computer processors and computer storage storing a computer program for causing the one or more processors to perform the method of claim 23.

52. An apparatus comprising one or more computer processors and computer storage storing a computer program for causing the one or more processors to perform the method of claim 24.

53. An apparatus comprising one or more computer processors and computer storage storing a computer program for causing the one or more processors to perform the method of claim 30.

54. An apparatus comprising one or more computer processors and computer storage storing a computer program for causing the one or more processors to perform the method of claim 33.

55. An apparatus comprising one or more computer processors and computer storage storing a computer program for causing the one or more processors to perform the method of claim 34.

56. An apparatus comprising one or more computer processors and computer storage storing a computer program for causing the one or more processors to perform the method of claim 36.

57. A computer-readable manufacture storing one or more computer-readable instructions operable to cause a computer system to perform the method of claim 1.

58. A computer-readable manufacture storing one or more computer-readable instructions operable to cause a computer system to perform the method of claim 2.

59. A computer-readable manufacture storing one or more computer readable instructions operable to cause a computer system to perform the method of claim 3.

60. A computer-readable manufacture storing one or more computer-readable instructions operable to cause a computer system to perform the method of claim 4.

61. A computer-readable manufacture storing one or more computer instructions operable to cause a computer system to perform the method of claim 5.

62. A computer-readable manufacture storing one or more computer-readable instructions operable to cause a computer system to perform the method of claim 6.

63. A computer-readable manufacture storing one or more computer-readable instructions operable to cause a computer system to perform the method of claim 8.

64. A computer-readable manufacture storing one or more computer-readable instructions operable to cause a computer system to perform the method of claim 10.

65. A computer-readable manufacture storing one or more computer-readable instructions operable to cause a computer system to perform the method of claim 12.

66. A computer-readable manufacture storing one or more computer-readable instructions operable to cause a computer system to perform the method of claim 14.

67. A computer-readable manufacture storing one or more computer-readable instructions operable to cause a computer system to perform the method of claim 16.

68. A computer-readable manufacture storing one or more computer-readable instructions operable to cause a computer system to perform the method of claim 18.

69. A computer-readable manufacture storing one or more computer-readable instructions operable to cause a computer system to perform the method of claim 19.

70. A computer-readable manufacture storing one or more computer-readable instructions operable to cause a computer system to perform the method of claim 21.

71. A computer-readable manufacture storing one or more computer-readable instructions operable to cause a computer system to perform the method of claim 23.

72. A computer-readable manufacture storing one or more computer-readable instructions operable to cause a computer system to perform the method of claim 25.

73. A computer-readable manufacture storing one or more computer-readable instructions operable to cause a computer system to perform the method of claim 30.

74. A computer-readable manufacture storing one or more computer-readable instructions operable to cause a computer system to perform the method of claim 33.

75. A computer-readable manufacture storing one or more computer-readable instructions operable to cause a computer system to perform the method of claim 36.

* * * * *